United States Patent
Silva et al.

(10) Patent No.: US 7,014,883 B1
(45) Date of Patent: Mar. 21, 2006

(54) APPARATUS AND METHOD FOR FORMING A COMPOSITE STRUCTURE

(75) Inventors: Ernie R. Silva, La Verne, CA (US); Jerry W. Brimer, Canyon County, CA (US); Sandra J. Stash, Stanton, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/757,761

(22) Filed: Jan. 14, 2004

Related U.S. Application Data

(62) Division of application No. 09/542,631, filed on Apr. 4, 2000, now Pat. No. 6,692,817.

(51) Int. Cl.
*B05D 1/04* (2006.01)
*B05D 1/38* (2006.01)

(52) U.S. Cl. .............. 427/133; 427/475; 427/485; 427/202; 427/282

(58) Field of Classification Search ............ 427/135, 427/181, 202–203, 409, 282, 470, 475, 476, 427/485, 486, 133
See application file for complete search history.

(56) References Cited

U.S. PATENT DOCUMENTS

| | | | |
|---|---|---|---|
| 3,770,482 A | 11/1973 | Millar et al. ............... 117/17 |
| 3,928,655 A | 12/1975 | Iwasa et al. .............. 430/125 |
| 4,034,794 A | 7/1977 | Gebler et al. .............. 164/72 |
| 4,104,416 A * | 8/1978 | Parthasarathy et al. ..... 427/473 |
| 4,120,930 A | 10/1978 | Lemelson ................... 264/225 |
| 4,220,675 A | 9/1980 | Imazaki ....................... 427/27 |
| 4,268,542 A | 5/1981 | Sakakibara et al. ......... 427/195 |
| 4,540,637 A | 9/1985 | Geary et al. ................ 428/626 |
| 4,673,712 A * | 6/1987 | Fukui et al. ................ 526/253 |
| 4,705,720 A | 11/1987 | Kundinger et al. ......... 428/332 |
| 4,711,833 A | 12/1987 | McAneney et al. ......... 430/131 |
| 5,000,979 A | 3/1991 | Cueman et al. .............. 427/27 |
| 5,232,746 A | 8/1993 | Bladel et al. ............... 427/470 |
| 5,284,683 A | 2/1994 | Erhan ......................... 427/404 |
| 5,342,812 A * | 8/1994 | Niskanen et al. ........... 501/127 |
| 5,370,931 A | 12/1994 | Fratangelo et al. ......... 428/334 |
| 5,535,980 A | 7/1996 | Baumgartner et al. ... 249/114.1 |
| 5,578,381 A | 11/1996 | Hamada et al. ............ 428/447 |
| 5,626,907 A | 5/1997 | Hagiwara et al. .......... 427/202 |
| 5,653,835 A | 8/1997 | Glen ............................ 156/98 |
| 5,656,121 A | 8/1997 | Fukushi ...................... 156/326 |
| 5,709,949 A * | 1/1998 | Chen et al. ................. 428/421 |
| 5,731,042 A | 3/1998 | Glende et al. .............. 427/470 |
| 5,736,247 A | 4/1998 | Takada et al. .............. 428/424 |
| 5,780,121 A | 7/1998 | Endo ........................... 427/569 |
| 5,820,938 A | 10/1998 | Pank et al. ................. 427/449 |
| 5,827,567 A * | 10/1998 | Molitor ...................... 427/135 |
| 5,848,327 A | 12/1998 | Badesha et al. .............. 399/99 |
| 5,891,515 A * | 4/1999 | Dutheil et al. ............. 427/185 |
| 5,998,034 A | 12/1999 | Marvil et al. .............. 428/422 |
| 6,270,853 B1 | 8/2001 | Brown et al. .............. 427/470 |

* cited by examiner

FOREIGN PATENT DOCUMENTS

WO WO 89/03739 5/1989

*Primary Examiner*—Fred J. Parker
(74) *Attorney, Agent, or Firm*—Fulbright&Jaworski LLP

(57) ABSTRACT

A method for forming a composite structure is disclosed. The method includes four steps. Step one calls for applying a primer (104) to a surface (102) of a tool (100). Step two requires applying a coating (106) to primer (104). Step three calls for curing primer (104) and coating (106). The last step calls for forming the composite structure on tool (100). More specifically, primer (104) may be a powdered primer, and coating (106) may be a powdered fluorinated organic compound.

22 Claims, 2 Drawing Sheets

APPARATUS AND METHOD FOR FORMING A COMPOSITE STRUCTURE

RELATED APPLICATIONS

This application is a divisional of U.S. application Ser. No. 09/542,631 filed Apr. 4, 2000 and entitled "Apparatus and Method for Forming a Composite Structure," that issued as U.S. Pat. No. 6,692,817 on Feb. 17, 2004.

This application is related to U.S. application Ser. No. 09/248,172 filed Feb. 9, 1999 and entitled "Acid Impervious Coated Metal Substrate Surface and Method of Production," that issued as U.S. Pat. No. 6,124,000 on Sep. 26, 2000.

TECHNICAL FIELD OF THE INVENTION

This invention relates generally to the field of materials construction and, more specifically, to an apparatus and method for forming a composite structure.

BACKGROUND OF THE INVENTION

Composite structures are desirable in many industries for many applications. The aerospace industry, for example, uses composite structures extensively because, among other desirable attributes, composites have high strength-to-weight ratios. Because of the ever increasing use of composite structures throughout industry, manufacturers are continually searching for better and more economical ways of forming composite structures.

In the forming of composite structures many manufacturing steps are performed. One such step that is usually required is an elevated-temperature curing step. A composite structure is placed on a tool, which is normally the tool that was used to shape the composite structure, and then placed in an oven for a period of time. After the curing cycle the composite structure is removed from the tool. Most composite materials have a tendency to adhere to the tool, which may cause harm to the shape or surface of the composite structure when being removed. This is the reason release agents were developed. Before placing a composite structure on a tool, a release agent is applied to the tool surface to allow the composite structure to be easily removed from the tool after curing. This release agent needs to be reapplied to the tool before every curing cycle, which takes time. In addition, typical release agents are organic solvent-based, which emit pollution. Furthermore, some of the release agent transfers to the composite structure, which results in a time-consuming sanding step of the surface of the composite structure before painting.

The challenges in the field of forming composite materials continue to increase with demands for more and better techniques having greater flexibility and adaptability. Therefore, a need has arisen for a new apparatus and method for forming a composite structure.

SUMMARY OF THE INVENTION

In accordance with the present invention, an apparatus and method for forming a composite structure is provided that substantially eliminates or reduces disadvantages and problems associated with previously developed apparatuses and methods.

An apparatus for forming a composite structure is disclosed. The apparatus comprises a tool having a surface that is substantially covered by a primer and a coating. More specifically, the primer may be a powdered primer, and the coating may be a powdered fluorinated organic compound.

A method for forming a composite structure is disclosed. The method comprises four steps. Step one calls for applying a primer to a surface of a tool. Step two requires applying a coating to the primer. Step three calls for curing the primer and coating that are applied to the tool. The last step calls for forming the composite structure on the tool.

In accordance with another aspect of the present invention, a method for forming a composite structure is disclosed. The method comprises six steps. Step one calls for cleaning a surface of a tool with an environmentally friendly solvent. Step two requires covering a peripheral portion of the surface with, for example, masking tape. The third step calls for applying a powdered primer to the uncovered portion of the surface. Step four calls for applying a powdered coating to the primer. Step five requires the curing of the primer and coating that are applied to the tool. The last step allows for forming the composite structure on the tool.

A technical advantage of the present invention is the elimination of having to apply a release agent each time a composite structure is cured. The powdered primer and powdered coating will result in a more durable tool that can be used for numerous curing cycles. This will save time and money.

Another technical advantage of the present invention is that emissions from traditional release agents will be eliminated. The powdered primer and powdered coating are environmentally friendly, and will allow a manufacturer to meet tightening environmental regulations. This will also eliminate any permit and compliance issues associated with the current use of release agents.

An additional technical advantage of the present invention is that the number of times a composite structure has to be sanded before being painted will be substantially reduced. This will save time and money.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which.

DETAILED DESCRIPTION OF THE INVENTION

The preferred embodiments of the present invention and its advantages are drawings, in which like numerals refer to like parts.

Figure 1A:
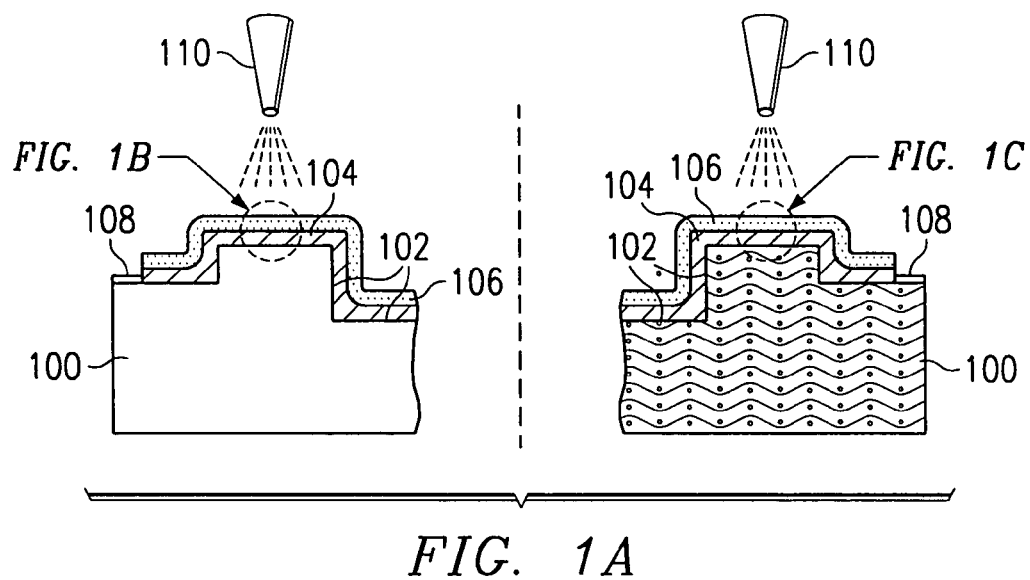
FIG. 1A is an elevation view of a tool useful in the practice of the present invention.

FIG. 1A is an elevation view of a tool 100 useful in the practice of one embodiment of the present invention. Tool 100 has a surface 102 in which there is a primer 104 and a coating 106 applied thereto. Tool 100, along with the applied primer 104 and coating 106, is used for the forming of composite structures. Solely for convenience, tool 100 is shown in FIG. 1A to be separated into two halves, each half being constructed of a different material. As illustrated by FIG. 1A, Tool 100 may be constructed of a metallic material, or tool 100 may be constructed of a composite material. Other types of materials are also contemplated by the present invention. Furthermore, the shape of tool 100 as shown in FIG. 1A is only one of many shapes that are possible. Depending on the final composite structure desired, tool 100 can be any shape imaginable.

Surface 102 is the "working surface" of tool 100. In other words, surface 102 is where the composite structure will be formed and, hence, where primer 104 and coating 106 will be applied. Surface 102 is normally prepared before the application of primer 104 and coating 106 by cleaning with an environmentally-friendly solvent, such as isopropyl alcohol. This solvent is then allowed to dry before the application of primer 104 and coating 106. It may be, however, unnecessary to clean surface 102 depending on its initial condition. On the other hand, before cleaning surface 102 with a solvent, surface 102 may be abraded with, for example, a Scotchbrite and a jitter bug sander. In the case of tool 100 being constructed of a composite material, there may be an additional preparation step after cleaning the surface with a solvent. This would be a step of applying a surfactant solution, which may be any of a myriad of commercially-available soaps. This surfactant solution is also allowed to dry on surface 102 before application of primer 104 and coating 106.

In another embodiment of the present invention, the preparation of surface 102 may also include a covering of the periphery of surface 102 with a tape 108. Tape 108 may be a masking tape or any other tape that is adequate to protect the periphery of surface 102 when applying primer 104 and coating 106. This covering of the periphery of surface 102 is for any subsequent sealant that would be used for vacuum bag forming of a composite structure.

Figures 1B, 1C:
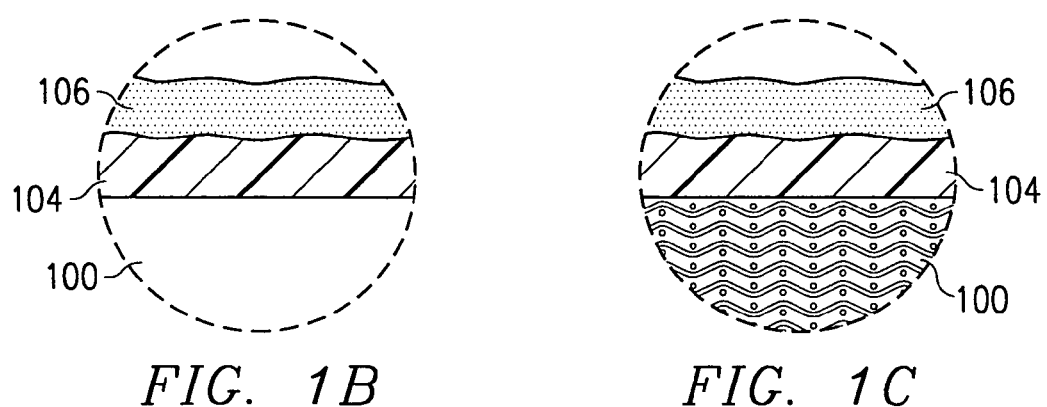
FIG. 1B is a fragmented view of a metallic tool useful in the practice of the present invention showing, in greater detail, the primer, coating, and surface of the metallic tool.
FIG. 1C is a fragmented view of a composite tool useful in the practice of the present invention showing, in greater detail, the primer, coating, and surface of the composite tool.

FIG. 1B is a fragmented view of one embodiment of the present invention showing tool 100 constructed of metallic material. In this embodiment, primer 104 is a fluorinated powdered primer used for fluorinated compounds, and is used to obtain a good bond between coating 106 and tool 100. As examples, primer 104 may be tetrafluoroethylene or an ethylene polymer blended with epoxy. Other fluorinated hydrocarbons are contemplated by the present invention for use as primer 104. The thickness of primer 104 will generally be 2–3 mils. However, depending on the type of material used, and the method of application, other thicknesses are contemplated. Primer 104 is typically sprayed onto surface 102 of tool 100 by an electrostatic powder spray gun 110 as illustrated in FIG. 1A. Electrostatic powder spray guns are well known in the art of material coatings. Other methods of applying primer 104 to surface 102 of tool 100 are contemplated by the present invention.

FIG. 1C is a fragmented view of another embodiment of the present invention showing tool 100 constructed of composite material. In this embodiment, primer 104 is a nylon-powdered primer. Nylon is used because it has release properties of its own. Other types of primer 104 are contemplated by the present invention. Once again, primer 104 is typically sprayed onto surface 102 of tool 100 by an electrostatic powder spray gun 110. However, other methods of applying primer 104 are contemplated.

Referring to either FIG. 1B or FIG. 1C, coating 106 is shown. Coating 106 is used as the release agent when constructing a composite structure with tool 100. Coating 106 is a fluorinated hydrocarbon in powdered form, and is commercially available. Examples of coating 106 are Dyher 820 by Whifford Inc., Teflon manufactured by DuPont and distributed by Intech, and Halar by Ausimont USA, Inc. Other types of fluorinated powdered hydrocarbons are also contemplated by the present invention. The thickness of coating 106 will generally be 2–3 mils. However, depending on the type of material used, and the method of application, other thicknesses are contemplated. A conventional corona electrostatic coating process, using electrostatic powder spray gun 110, may be used to apply coating 106 to primer 104. Coating 106 will chemically or mechanically bond to primer 104 after application. Using powdered fluorinated hydrocarbons for coating 106 eliminates emission problems typical of the traditional release agents, such as Frecote 44NC, used in constructing composite structures. This will allow manufacturers to meet tightening environmental regulations, and will eliminate any permit and compliance issues associated with the use of traditional release agents.

After the application of both primer 104 and coating 106 to surface 102 of tool 100, a curing cycle is typically performed. Tool 100 is coupled to a heat source, such as an oven, for a certain period of time depending on the type of coating 106 used. The temperature used in the curing process varies depending on the type of material used for tool 100, but will generally be greater than approximately 450° F. Solely as an example, if Halar is used as a coating for tool 100 made of steel, tool 100 would be cured at approximately 535° F. for approximately twenty minutes. After the curing cycle, tool 100 is allowed to cool down to ambient temperature. Tool 100 is then ready for forming composite structures.

In an embodiment where tool 100 is made of composite material, as shown in FIG. 1C, the nylon-powdered primer will melt during the curing cycle, and the nylon will flow around the fluoropolymer particles contained in coating 106 and mechanically lock them into place. A durable coating 106 will result. No matter what type of material tool 100 is constructed of, a smooth, tack-resistant surface of coating 106 also results. This means that when forming a composite structure using tool 100, many cycles of use can be accomplished before having to inspect surface 102 of tool 100 for recoating. This eliminates the traditional step of having to apply a release agent each time a composite structure is cured, which will save time and money. In addition, more time and money will be saved by the use of primer 104 and coating 106 because of the elimination of a sanding step that is typical with the use of traditional release agents. Using traditional release agents results in a transfer of some of the release agent into the composite tool being formed, which means the composite structure has to be sanded before being painted. With the present invention, there is no transfer of primer 104 and/or coating 106 to composite structures during the curing cycle.

Figure 2:
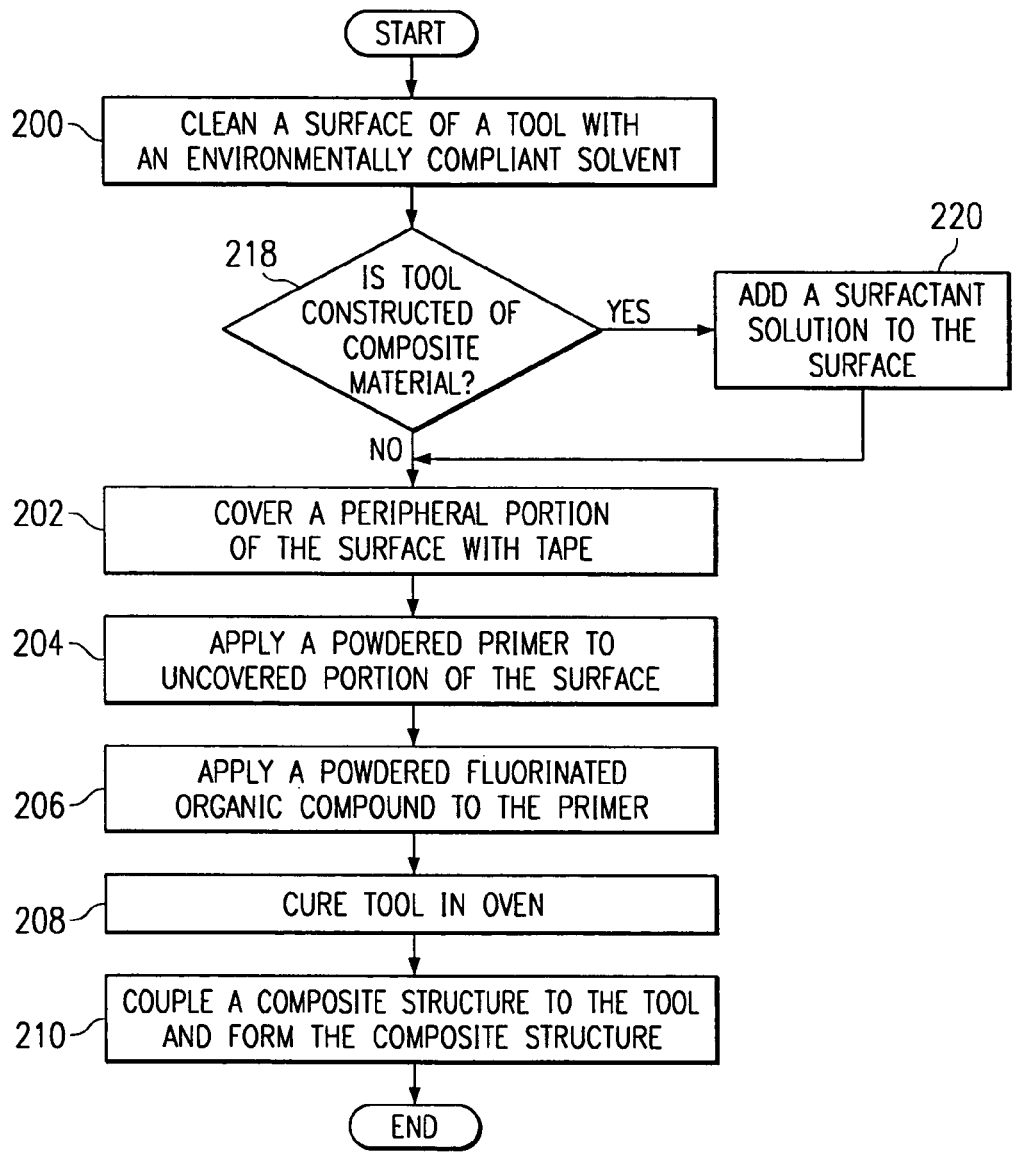
FIG. 2 is a flowchart demonstrating one method of forming a composite structure in accordance with the present invention.

FIG. 2 is a flowchart demonstrating one method of forming a composite structure in accordance with the present invention. In one embodiment, surface 102 of tool 100 is cleaned with an environmentally compliant solvent at step 200. If tool 100 is constructed of composite material, then a surfactant solution is also applied to surface 102 and allowed to dry at step 220. In any case, the next step is to cover a peripheral portion of surface 102 with tape 108 at step 202. Then powdered primer 104 can be applied to the uncovered portion of surface 102 at step 204. In the case of tool 100 being made of composite material, powder primer 104 will comprise a nylon-powdered primer. After the application of powdered primer 104, coating 106, which comprises a powdered fluorinated organic compound, is applied to primer 104 at step 206. Tool 100 is then cured in an oven for a period of time at step 208 and a composite structure is coupled to tool 100 and formed at step 210.

Although an embodiment of the invention and its advantages are described in detail, a person skilled in the art could make various alternations, additions, and omissions without departing from the spirit and scope of the present invention as defined by the appended claims.

What is claimed is:

1. A method for forming a composite structure, the method comprising:
    applying a surfactant solution to a surface of a tool and drying said surfactant solution to form a surfactant-coated surface, wherein said tool comprises composite material;
    applying a primer to said surfactant-coated surface of a tool;
    applying a coating to the primer;
    curing the primer and coating applied to the tool to form a durable coating;
    forming the composite structure from the tool, said durable coating remaining substantially bound to said tool.

2. The method of claim 1 wherein the tool is a metallic material.

3. The method of claim 1 wherein the tool is a composite material.

4. The method of claim 1 wherein the primer is a powdered primer.

5. The method of claim 1 wherein the primer is a nylon powder primer.

6. The method of claim 1 wherein the coating is a powdered fluorinated organic compound.

7. The method of claim 1 wherein at least one of the applying steps comprises electrostatic powder spraying.

8. The method of claim 1 wherein the forming step comprises placing the tool in an oven and heating the oven.

9. The method of claim 1 further comprising the step of cleaning the surface of the tool with a solvent before applying the primer.

10. The method of claim 9 wherein the solvent is an isopropyl alcohol.

11. The method of claim 1 further comprising the step of coupling tape to a peripheral portion of the surface before applying the primer.

12. A method for forming a composite structure, the method comprising:
    cleaning a surface of a tool, the surface having a peripheral portion, wherein said tool comprises composite material;
    covering the peripheral portion;
    applying a surfactant solution to the uncovered portion of the surface and drying said surfactant solution to form a surfactant-coated uncovered surface;
    applying a primer to the surfactant-coated uncovered portion of the surface;
    applying a coating to the primer;
    curing the primer and coating applied to the tool to form a durable coating on said tool; and
    forming the composite structure on the tool; and
    removing the composite structure from the tool, said durable coating remaining substantially bound to said tool.

13. The method of claim 12 wherein the tool is comprises a steel mold for forming composite structures.

14. The method of claim 12 wherein the tool is a composite mold for forming composite structures.

15. The method of claim 12 wherein the primer is a powdered primer.

16. The method of claim 12 wherein the primer is a nylon powder primer.

17. The method of claim 12 wherein the coating is a powdered fluorinated organic compound.

18. The method of claim 12 wherein at least one of the applying steps comprises electrostatic powder spraying.

19. The method of claim 12 wherein the forming step comprises placing the tool in an oven and heating the oven to at least 450 degrees Fahrenheit.

20. The method of claim 12 wherein the cleaning step comprises applying a solvent to the surface of the tool.

21. The method of claim 20 wherein the solvent is an isopropyl alcohol.

22. The method of claim 12 wherein the covering step comprises coupling masking tape to the peripheral portion of the surface.

* * * * *

UNITED STATES PATENT AND TRADEMARK OFFICE
CERTIFICATE OF CORRECTION

PATENT NO. : 7,014,883 B1
APPLICATION NO. : 10/757761
DATED : March 21, 2006
INVENTOR(S) : Ernie R. Silva et al.

It is certified that error appears in the above-identified patent and that said Letters Patent is hereby corrected as shown below:

Column 5,
Line 25, delete "from the tool, said" and replace with -- on the tool; and removing the composite structure from the tool, said --.

Column 6,
Line 17, delete "and".
Line 22, delete "is".

Signed and Sealed this

Twentieth Day of June, 2006

JON W. DUDAS
*Director of the United States Patent and Trademark Office*